UNITED STATES PATENT OFFICE.

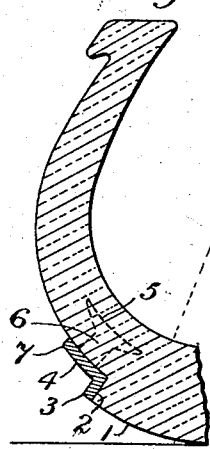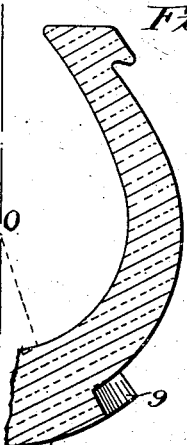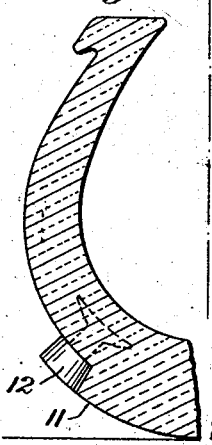
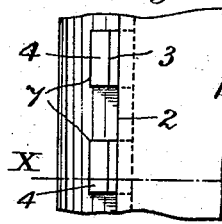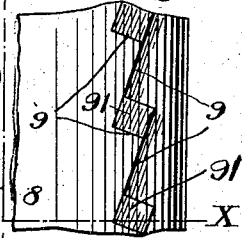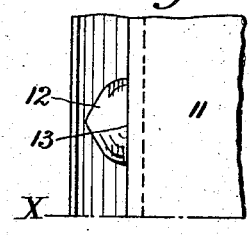
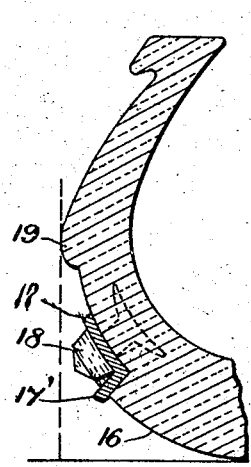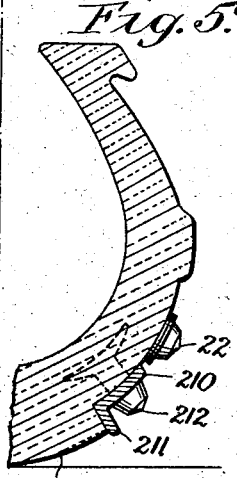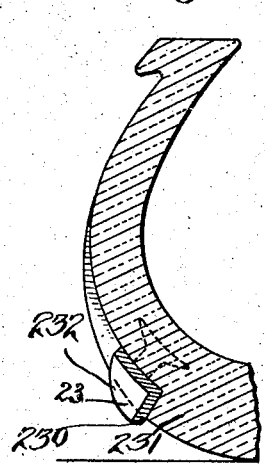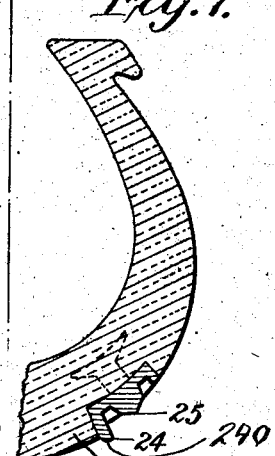
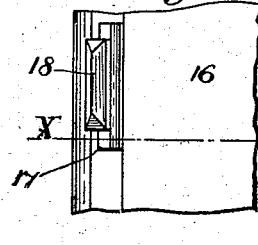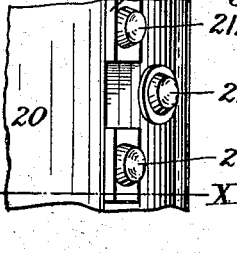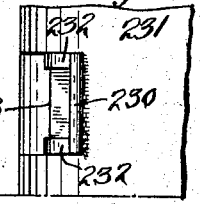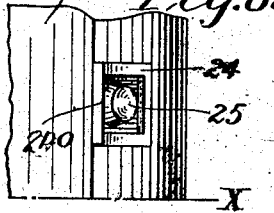

AMBROSE MACDONALD POYNTER, OF LONDON, ENGLAND.

TIRE.

1,335,916.  Specification of Letters Patent.  Patented Apr. 6, 1920.

Application filed December 17, 1918. Serial No. 267,219.

*To all whom it may concern:*

Be it known that I, AMBROSE MACDONALD POYNTER, a subject of the King of the United Kingdom of Great Britain and Ireland, residing at 16 Ebury street, in the county of London, England, have invented certain new and useful Improvements in and Relating to Tires, of which the following is a specification.

This invention relates to tires and in particular to pneumatic, solid rubber or the like elastic tires and has for its object the provision of tires which, when running, will side-slip, if at all, only to a comparatively slight extent.

Tires according to the present invention are provided with one or more peripheral series of separate external anti-side-slip studs, with or without angle-plates, which are not integral with the tire but which are so mounted thereon that portions of the tire abut laterally against their outer ends or heads or angle-plates on the latter and form lateral supports for the same at their inner sides, that is, at the sides nearer to the center of the tread, so that when said studs are in contact with the ground and are in part more or less embedded in the latter said studs are supported at their sides and are so more or less prevented from losing their engagement with the ground through the stresses on them bringing about temporary or permanent distortion relatively to the tire. Such lateral support also helps to prevent the studs from being torn away from the tire or from becoming permanently deformed. Further, such lateral support is mutual since the studs serve to stiffen the tread itself and thus reduce the liability of the tire to distortion and render side-slip less likely to occur.

In order to afford a maximum of support the faces or facelets of the tire affording the lateral support are formed to extend in substantially radial directions relative to the center line of the tire and the studs are likewise disposed in substantially radial lines. In order to economize material the tread portion of the tire is preferably materially the thicker part of the tire the thickness of the sides of the tire at the outer sides of the devices being materially reduced. In such cases the abutment surfaces on the studs may lie against the edges of the tread portion. Equivalently, the anti-side-slip studs may be situated in grooves or in a series of recesses running circumferentially at the sides of the tires.

The anti-slip studs are preferably mounted sufficiently far from the center of the tread to be normally out of contact with the ground but sufficiently near to said center to come into contact with the ground on side-slipping commencing to occur.

Said studs may, however, be so located on the tire that some studs are always in contact with the ground, or some of the studs may be so arranged as to come into contact with the ground normally once per revolution of the tire and others be so arranged as to make such contact once per revolution only when side-slipping commences to occur.

The studs may comprise some parts adapted efficiently to coact with the ground to prevent or retard side-slipping and other parts designed to coact with the tire to enable the stress on the parts coacting with the ground to be transmitted directly to the tread portion of the tire, thus avoiding undue distortion of the studs relatively to the tire or deformations of the studs themselves.

In order that this invention may be more clearly understood eight particular embodiments of the invention will now be described, by way of example, with reference to the drawings accompanying this specification.

Figures 1 and 2 are a vertical section and fragmentary edge view respectively of a tire embodying the invention;

Figs. 1ª, 3, 3ª, 5, 5ª, 7 and 7ª are vertical sections similar to Fig. 1 showing modified forms; and Figs. 2ª, 4, 4ª, 6, 6ª, 8 and 8ª are fragmentary edge views of the devices shown in Figs. 1ª, 3, 3ª, 5, 5ª, 7 and 7ª respectively.

In Figs. 1 and 2, 1 represents a thick projecting tread defining a lateral conical surface 2 directed toward the central line of the tire. Against this surface bear the outwardly projecting flanges 3 of the head 7 of anti-slipping studs 4 which also comprise a base 5 and a shank 6. The studs are also preferably mounted in radial direction with respect to the central line O of the tire.

When side-slipping occurs the sides 3, of some of the studs at the side of the tire toward which the slipping takes place, make contact with the ground and are laterally supported by the edge 2 of the tread portion. In this particular form the side 3 does not project beyond the surface of the tread portion.

Figs. 1ª and 2ª show an arrangement in which the thick tread portion 8 has a serrated edge 9 in the inner angles of which square anti-slipping studs 91 are fixed. Said edge forms abutments for the heads of the said studs.

In Figs. 3 and 4, the tread portion 11 is like that in Figs. 1 and 2, but the heads of the studs 12 have flat inner sides 13 and curved outer sides as shown.

In Figs. 3ª and 4ª the head 14 projects into the tread portion 15, the edges of which for this purpose are provided with a series of polygonal recesses corresponding to the shape of the head.

In Figs. 5 and 6, the tread portion 16 is like that shown in Fig. 1 and the device comprises an angle plate 17 and a stud 18. The side member 17' of the angle plate 17 projects slightly beyond the surface of the tread portion 16. In connection with this form a rib 19 is shown which may be provided to protect the studs against injury when the wheels are turned sharp up against a curb. However, this provision is entirely optional.

In Figs. 5ª and 6ª the arrangement is essentially the same as that shown in Fig. 5. However, in addition to the series of studs 212 and angle plate 210 having protecting sides 211 there is a second series of studs 22 running parallel with the former. These studs 22 may be of such height that they make contact with the ground when the tire is laterally distorted to a considerable extent.

In the form shown in Figs. 7 and 8 the anti-slipping studs 23 are positioned in recesses formed in the outer surface of the tire. Each stud comprises a head having a projecting side 230 which abuts against the tread portion 231 and sides 232 which are seated against the walls of the recess.

In Figs. 7ª and 8ª the heads of the anti-slipping studs 24 are positioned in recesses of corresponding shape. Each stud comprises an angle plate having a projecting side 240 which abuts against the tread portion 241 and a projection 25.

It is understood that the running surface of the tread may be of any suitable type.

While I have shown various ways in which the invention may be applied, various other modifications may be resorted to within the scope of the claims.

What I claim is:—

1. An elastic tire having a tread portion formed to define lateral shoulders and anti-slipping studs on the tire, said studs comprising angle-plates the side portion of which abuts against the said shoulder and the base portion is seated against the tire.

2. A tire according to claim 1 in which said side portion projects beyond the surface of the tread portion.

3. A tire according to claim 1 in which the stud is also provided with a projection forming part of the said base portion.

4. A tire according to claim 1 in which the said base portions are seated in depressions formed in the surface of the tire.

5. An elastic tire having a tread portion formed to define lateral surfaces directed radially toward the central line of the tire and a plurality of anti-slipping studs having anchoring portions disposed in substantially radial lines and head portions in abutting relation with said lateral surfaces, said head portions terminating in edges parallel to said surfaces.

6. A tire according to claim 5 in which the tire is formed to define recesses whose walls contact with a plurality of sides of the said head portions.

7. An elastic tire having a plurality of recesses in its outer surface defining lateral surfaces of the tread portion directed radially toward the central line of the tire and anti-slipping studs having heads seated in said recesses and contacting with the walls of said recesses, said heads terminating in edges parallel to said surfaces.

8. A tire according to claim 7 in which the heads comprise angle plates having outwardly directed sides in contact with the said lateral surfaces.

9. A tire according to claim 8 in which the said angle plates have additional outwardly directed sides in contact with walls of the recesses.

10. A tire according to claim 5 in which the heads consist of angle plates having outwardly directed sides in contact with the said lateral surfaces.

11. A tire according to claim 10 in which the angle plates are also provided with an outwardly directed projection.

12. A tire according to claim 10 in which the outwardly directed sides project beyond the surface of the tread portion.

In testimony whereof, I affix my signature in the presence of two witnesses.

AMBROSE MACDONALD POYNTER.

Witnesses:
HENRY SAMUEL PLUCKNETT HENDLEY,
RICHARD HENRY WAY.